United States Patent
Kurihara

(10) Patent No.: US 10,567,513 B2
(45) Date of Patent: Feb. 18, 2020

(54) TRANSMISSION CONTROL METHOD AND TRANSMISSION CONTROL APPARATUS

(71) Applicant: FUJITSU LIMITED, Kawasaki-shi, Kanagawa (JP)

(72) Inventor: Yuma Kurihara, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 25 days.

(21) Appl. No.: 15/953,566

(22) Filed: Apr. 16, 2018

(65) Prior Publication Data
US 2018/0309830 A1    Oct. 25, 2018

(30) Foreign Application Priority Data

Apr. 19, 2017   (JP) .................................. 2017-082934

(51) Int. Cl.

| | |
|---|---|
| G06F 15/173 | (2006.01) |
| H04L 29/08 | (2006.01) |
| H04W 4/70 | (2018.01) |
| H04W 4/08 | (2009.01) |
| H04W 4/38 | (2018.01) |

(52) U.S. Cl.
CPC .......... *H04L 67/12* (2013.01); *H04L 67/2842* (2013.01); *H04W 4/08* (2013.01); *H04W 4/38* (2018.02); *H04W 4/70* (2018.02)

(58) Field of Classification Search
CPC ..... H04L 67/2842; H04L 67/12; H04L 29/00; H04W 4/70; H04W 4/38; H04W 4/08
See application file for complete search history.

(56) References Cited

U.S. PATENT DOCUMENTS

| | | | | |
|---|---|---|---|---|
| 7,860,917 | B2 * | 12/2010 | Moriwaki | H04L 67/12 709/201 |
| 9,693,244 | B2 * | 6/2017 | Maruhashi | H04L 12/403 |
| 2011/0289133 | A1 * | 11/2011 | Shikano | H04L 67/12 709/202 |
| 2015/0032418 | A1 * | 1/2015 | Akiyama | G07C 5/085 702/190 |
| 2015/0382228 | A1 * | 12/2015 | Otomo | H04L 67/12 370/230 |

(Continued)

FOREIGN PATENT DOCUMENTS

| | | |
|---|---|---|
| JP | 2002-368623 | 12/2002 |
| JP | 2012-221368 | 11/2012 |

(Continued)

*Primary Examiner* — Cheikh T Ndiaye
(74) *Attorney, Agent, or Firm* — Fujitsu Patent Center

(57) ABSTRACT

A transmission control method includes receiving first data detected by a first sensor among a plurality of sensors, specifying identification information of a first sensor group that includes the first sensor in accordance with relation information representing relations between each of the plurality of sensors and each of a plurality of sensor groups, specifying a first plurality of pieces of transmitted data associated with the identification information of the first sensor group from among a group of transmitted data that have been transmitted to a server device, determining whether the first plurality of pieces of transmitted data include the first data, and when the first plurality of pieces of transmitted data include the first data, transmitting identification information of the transmitted first data to the server device without transmitting the received first data.

15 Claims, 10 Drawing Sheets

(56) References Cited

U.S. PATENT DOCUMENTS

2016/0366213 A1* 12/2016 Kazanchian .......... H04W 76/25
2017/0006435 A1*  1/2017 Yamamoto ............. H04W 4/70

FOREIGN PATENT DOCUMENTS

| JP | 2014-78134  | 5/2014  |
| JP | 2016-521402 | 7/2016  |
| WO | 2014/156182 | 10/2014 |

* cited by examiner

FIG. 3

| SENSOR ID | SENSOR GROUP |
|---|---|
| 1 | A |
| 2 | B |
| 3 | A |
| ⋮ | |

FIG. 4

A group_id AAAA1: {32C, 61.2P}

B group_id BBBB2: {24C, 62.2P}

A group_id AAAA5: {30C, 64.4P}

A group_id AAAA12: {29C, 61.1P}

B group_id BBBB7: {23C, 62.1P}

TRANSMISSION CONTROL METHOD AND TRANSMISSION CONTROL APPARATUS

CROSS-REFERENCE TO RELATED APPLICATION

This application is based upon and claims the benefit of priority of the prior Japanese Patent Application No. 2017-82934, filed on Apr. 19, 2017, the entire contents of which are incorporated herein by reference.

FIELD

The embodiments discussed herein are related to a transmission control technique.

BACKGROUND

In the Internet of Things (IoT), a server receives sensor data concerning temperature, humidity, and pressure, and the server transmits such data to a cloud computing environment via a network such as the Internet.

For example, Japanese Laid-open Patent Publication No. 2014-078134, Japanese Laid-open Patent Publication No. 2002-368623, Japanese National Publication of International Patent Application No. 2016-521402, and Japanese Laid-open Patent Publication No. 2012-221368 disclose the related art.

SUMMARY

According to an aspect of the invention, a transmission control method includes receiving first data detected by a first sensor among a plurality of sensors, specifying identification information of a first sensor group that includes the first sensor in accordance with relation information representing relations between each of the plurality of sensors and each of a plurality of sensor groups, specifying a first plurality of pieces of transmitted data associated with the identification information of the first sensor group from among a group of transmitted data that have been transmitted to a server device, determining whether the first plurality of pieces of transmitted data include the first data, and when the first plurality of pieces of transmitted data include the first data, transmitting identification information of the transmitted first data to the server device without transmitting the received first data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating example group data according to the first embodiment;

FIG. 4 is a diagram illustrating a data structure in a cache memory according to the first embodiment;

DESCRIPTION OF EMBODIMENTS

In the related art, when a server transmits a large amount of data received from tens to hundreds of sensors to a cloud computing environment, heavy loads are placed on a network.

The following techniques to reduce the loads placed on the network are conceivable. For example, a server stores in association with a unique identifier (ID) a data item that has been transmitted to a cloud computing environment. When the server accepts a new data item from a sensor, the server compares the accepted data item with the stored data items successively. If a data item that is the same as the accepted data item is stored, the server transmits an ID to the cloud computing environment. In contrast, if no data item that is the same as the accepted data item is stored, the server transmits an ID and the accepted data item to the cloud computing environment.

However, if an accepted data item of a sensor is compared with all the transmitted data items of the sensors, a load to determine whether the accepted data item is to be transmitted increases.

Hereinafter, embodiments will be described in detail with reference to the drawings. The embodiments are not meant to limit the disclosed technique. The embodiments may be combined as appropriate as long as no discrepancy occurs.

First Embodiment

Description of Entire System

Figure 1:
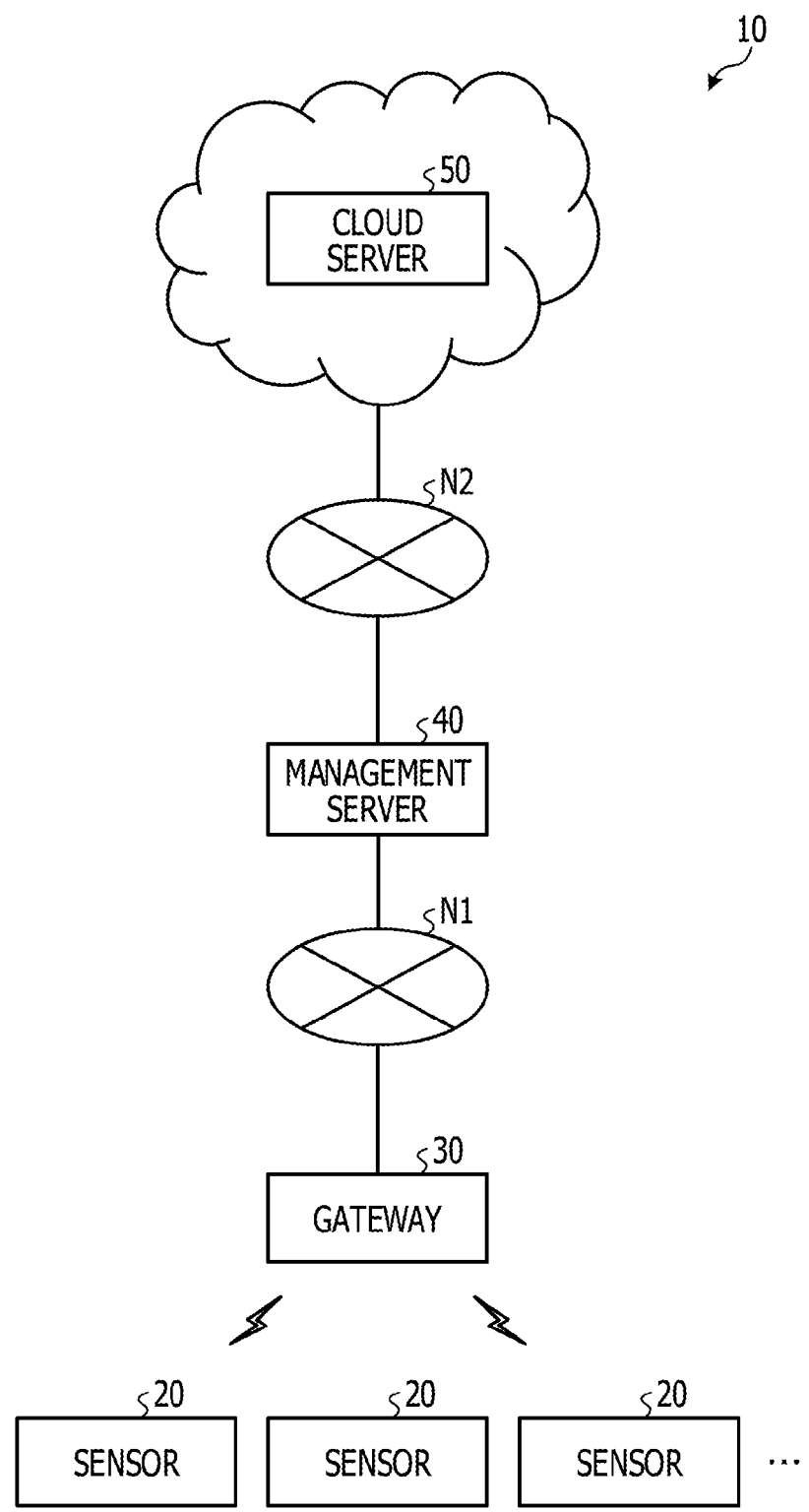
FIG. 1 is a diagram illustrating an example system configuration according to a first embodiment.

First, a schematic configuration of a system that collects data from sensors will be described. FIG. 1 is a diagram illustrating an example system configuration according to a first embodiment. A system 10 includes sensors 20, a gateway 30, a management server 40, and a cloud server 50.

The sensors 20, the gateway 30, and the management server 40 are disposed at an observation location where conditions are detected. The gateway 30 and the management server 40 are communicatively connected to each other via a network N1. Any kind of wired or wireless communication network, such as a local area network (LAN), may be used for the network N1.

The cloud server 50 is disposed in a cloud computing environment. The management server 40 and the cloud server 50 are communicatively connected to each other via a network N2. Any kind of wired or wireless communication network, such as the Internet, a LAN, or a virtual private network (VPN), may be used for the network N2.

The sensors 20 are sensing devices disposed for target objects whose conditions are detected. In an IoT setup, the sensors 20 are disposed for various target objects and detect the conditions thereof. In the example in FIG. 1, three sensors 20 are depicted, but any number of sensors 20 may be used. In this embodiment, a case where the sensors 20 placed at various locations detect conditions such as temperature and pressure will be described. The conditions to be detected are not limited to temperature or pressure.

Each of the sensors 20 includes a detector that detects a condition, a wireless communication unit capable of short-distance wireless communication, for example, Bluetooth (registered trademark) or ZigBee (registered trademark), and a power unit, such as a button cell battery, that supplies electric power to the detector and the wireless communication unit. A unique sensor ID is assigned to each of the sensors 20 as identification information to identify the sensor 20. In the sensor 20, the detector detects a condition of a target object, and the wireless communication unit periodically transmits via wireless transmission a data item that includes the sensor ID and condition information indicating the detected condition. For example, the sensor 20 periodically detects temperature and pressure and transmits via wireless transmission a sensor data item that includes the sensor ID and detected data indicating detected values of temperature and pressure.

The sensor data item transmitted from the sensor 20 is transmitted to the gateway 30 via a wireless access point (not depicted). The gateway 30 transmits the received sensor data item to the management server 40. The gateway 30 may also serve as the wireless access point. In the example in FIG. 1, only one gateway 30 is depicted, but any number of gateways 30 may be used. For example, a plurality of gateways 30 may be disposed so that each of the plurality of gateways 30 covers a predetermined number of the sensors 20 or a predetermined area where the sensors 20 are disposed.

The management server 40 is an example of a transmission control apparatus that is placed at the observation location and that manages sensor data items received from the gateway 30. The management server 40 performs various processing operations described below on the sensor data items received from the gateway 30 and transmits various data items to the cloud server 50. For example, a desktop or portable personal computer may be used as the management server 40. Instead of the portable personal computer, a tablet terminal, for example, may also be used as a portable terminal serving as the management server 40.

The cloud server 50 is an example of an information processing apparatus in the cloud computing environment, which collects sensor data items of the sensors 20 and analyzes the sensor data items. The cloud server 50 stores data items received from the management server 40 and performs various processing operations such as detection of changes in conditions of target objects. For example, a desktop server computer may be used as the cloud server 50. Cloud computing technology such as Software as a Service (SaaS) or Platform as a Service (PaaS) is employed in the cloud server 50.

Figure 2:
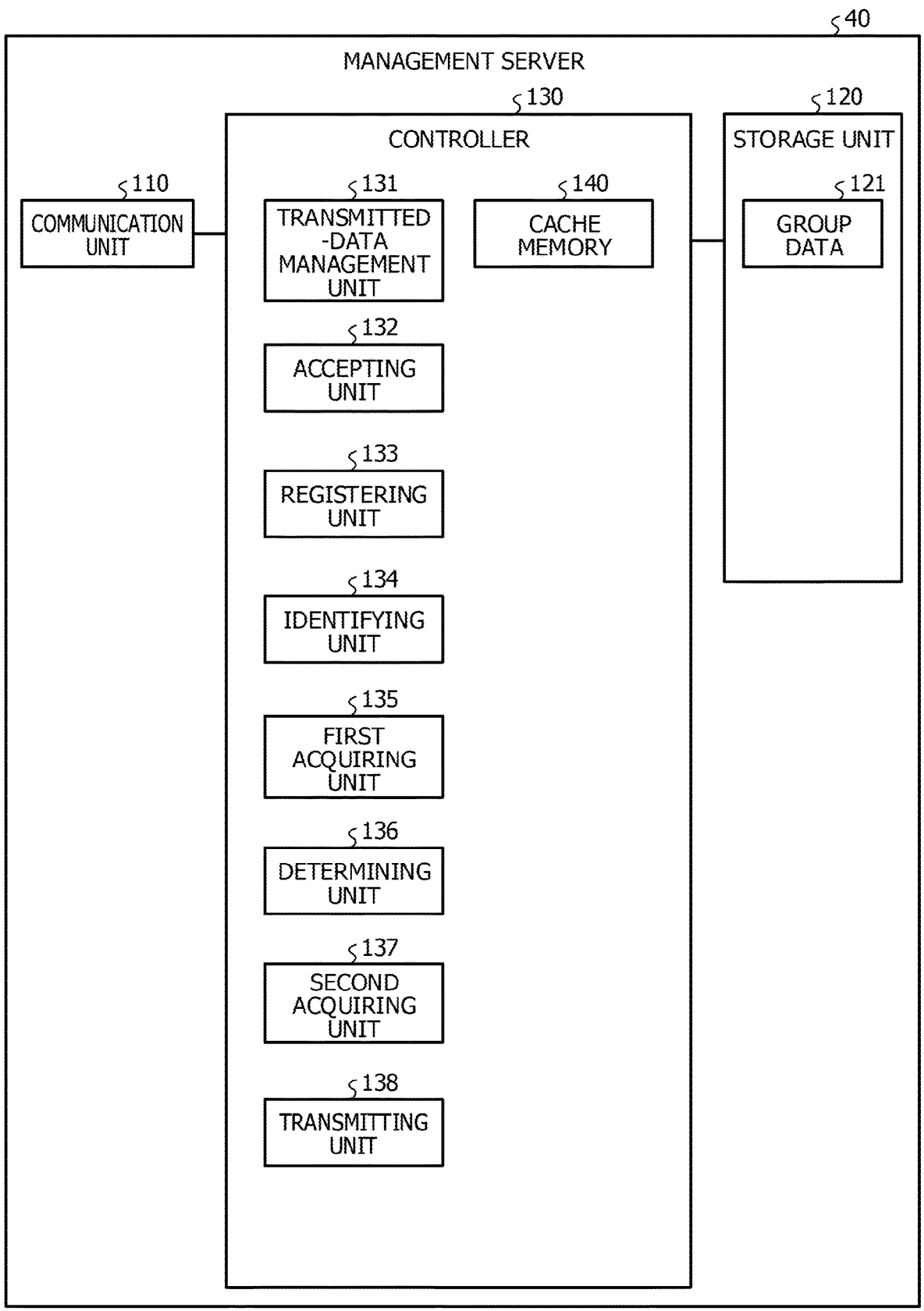
FIG. 2 is a block diagram illustrating a configuration of a management server according to the first embodiment.

Next, a configuration of the management server 40 will be described. FIG. 2 is a block diagram illustrating the configuration of the management server 40 according to the first embodiment. As illustrated in FIG. 2, the management server 40 includes a communication unit 110, a storage unit 120, and a controller 130. The management server 40 may include various functional units included in an available computer, for example, various input devices, an audio output device, and a display, in addition to the functional units depicted in FIG. 2.

The communication unit 110 is realized by a network interface card (NIC), for example. The communication unit 110 is a communication interface that is connected to other information processing apparatuses via the networks N1 and N2 by wired or wireless communication and that performs information communication with the other information processing apparatuses. For example, the communication unit 110 receives from the gateway 30 sensor data items transmitted from the sensors 20. The communication unit 110 also transmits various data items to the cloud server 50 in accordance with the control by the controller 130.

The storage unit 120 is realized by, for example, a semiconductor memory device such as a random access memory (RAM) or a flash memory, or a storage device such as a hard disk or an optical disc. The storage unit 120 has group data 121. The storage unit 120 also stores information used for processing in the controller 130.

The group data 121 stores information concerning sensor groups, into which the sensors 20 are categorized.

In the IoT setup, the sensors 20 are disposed for various target objects and detect various conditions thereof. The sensors 20 are commercially available from various manufacturers. Thus, sensor data items collected from the sensors 20 have various data formats, and detected data has various ranges of detected values. In this embodiment, the sensors 20 are categorized into the sensor groups in accordance with the data format and the range of detected values. Each of the sensors 20 in association with the sensor group to which the sensor 20 belongs is registered in the group data 121.

Figure 3:
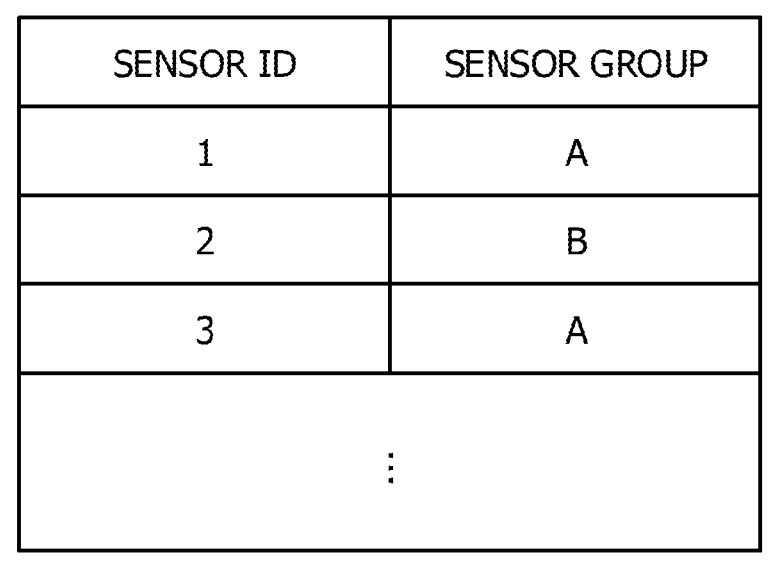

FIG. 3 is a diagram illustrating example group data according to the first embodiment. As illustrated in FIG. 3, the group data 121 includes items such as "SENSOR ID" and "SENSOR GROUP".

The item named "SENSOR ID" is the sensor ID of one of the sensors 20 with which a sensor group is associated. The item named "SENSOR GROUP" is information on the sensor group associated with the one of the sensors 20. The example in FIG. 3 illustrates that the sensor 20 having a sensor ID "1" belongs to a sensor group "A".

Referring back to FIG. 2, the controller 130 is a device that controls the management server 40. An electronic circuit such as a central processing unit (CPU) or a micro processing unit (MPU), or an integrated circuit such as an application specific integrated circuit (ASIC) or a field programmable gate array (FPGA) may be employed as the controller 130. The controller 130 includes an internal memory such as a cache memory 140. The internal memory stores data for control and programs to define various procedures. The controller 130 performs various processing operations by using the RAM or the internal memory as a work area.

The controller 130 functions as various processing units by executing various programs. For example, the controller 130 includes a transmitted-data management unit 131, an accepting unit 132, a registering unit 133, an identifying unit 134, a first acquiring unit 135, a determining unit 136, a second acquiring unit 137, and a transmitting unit 138. The controller 130 realizes or performs information processing functions and operations described below by using the various processing units. The internal configuration of the controller 130 is not limited to the configuration illustrated in FIG. 1, and other configurations that perform information processing described below may be used.

The transmitted-data management unit 131 stores in the cache memory 140 data items transmitted to the cloud server 50 and manages the data items. The storage capacity of the cache memory 140 has a limit, so that not all the transmitted data items may be stored. Thus, the transmitted-data management unit 131 manages the transmitted data items so as to retain in the cache memory 140 data items that are frequently used. For example, the transmitted-data management unit 131 manages the transmitted data items by a least recently used (LRU) method so that a predetermined number of transmitted data items are stored at maximum in the cache memory 140. The transmitted-data management unit 131 manages data items by using a list structure and moves a data item to the top of the list if the data item is used. If a requested data item is not found in the list, the transmitted-data management unit 131 removes a data item from the end of the list and adds a new data item to the top of the list.

FIG. 4 is a diagram illustrating a data structure in the cache memory 140 according to the first embodiment. The transmitted data items are stored in a list structure. In the example in FIG. 4, data field values such as "{32 C, 61.2 P}" represent a transmitted data item. The data field value "32 C" indicates that detected temperature is 32° C. The data field value "61.2 P" indicates that detected pressure is 61.2 Pa. A sensor group and a data ID to identify the data item are stored in association with the transmitted data item. In the example in FIG. 4, "A group_id AAAA1", which is stored in association with a transmitted data item, corresponds to the sensor group and the data ID that identifies the transmitted data item. The sensor group "A" is indicated by "A group". The data ID "AAAA1" is indicated by "id AAAA1".

Referring back to FIG. 2, the accepting unit 132 accepts various kinds of data items. For example, the accepting unit 132 accepts a sensor data item received by the communication unit 110.

The registering unit 133 registers in the group data 121 a sensor group that is associated with each of the sensors 20. For example, the registering unit 133 refers to the sensor data item accepted by the accepting unit 132 and registers in the group data 121 the sensor group that is associated with the sensor 20 in accordance with a data format of the sensor data item and a range of values in which detected data included in the sensor data item is found. For example, the registering unit 133 analyzes a sensor data item received from one of the sensors 20 and identifies the sensor ID of the sensor 20 that has transmitted the sensor data item. The registering unit 133 also searches for predetermined delimiters, for example, ",", "{", and "}", which are included in the sensor data item. Then, the registering unit 133 identifies data fields delimited by the delimiters included in the sensor data item. The registering unit 133 determines that sensor data items having the same number of data fields have the same data format and categorizes the sensors 20 into sensor groups in accordance with the data format. The registering unit 133 further categorizes the sensors 20 into sensor groups in accordance with a range of values in which a data field value is found. The registering unit 133 determines, for each of the sensor groups into which the sensors 20 are categorized, identification information of the sensor group and registers in the group data 121 the identification information of the sensor group and sensor IDs of the sensors 20 that belong to the sensor group. The registering unit 133 may categorize the sensors 20 into the sensor groups in accordance with a range of the average calculated for each of the data fields by analyzing a predetermined number of sensor data items received from each of the sensors 20. The registering unit 133 may categorize the sensors 20 into the sensor groups in accordance with a range in which the detected value is found most frequently by calculating a frequency of finding the detected value in the range for each of the data field by analyzing a predetermined number of sensor data items received from each of the sensors 20. The registering unit 133 may also categorize the sensors 20 into the sensor groups in accordance with the sensor IDs of the sensors 20, MAC addresses of the sensors 20, or types, conditions, or the like of the sensors 20.

The registering unit 133 may analyze the first sensor data item received from each of the sensors 20, associate a sensor group with the sensor 20, and register the sensor group and the sensor 20 in the group data 121. The registering unit 133 may categorize the sensors 20 into the sensor groups by analyzing a predetermined number of sensor data items received from each of the sensors 20. The registering unit 133 may update the sensor groups, which are associated with the sensors 20 and stored in the group data 121, at predetermined time points, such as once in every fixed period (for example, once every six hours). The registering unit 133 may also associate the sensor groups with the sensors 20 and register the sensor groups and the sensors 20 in the group data 121 in accordance with information concerning the sensors 20 and the sensor groups to be associated with the sensors 20, which is received from an external device such as the cloud server 50.

The identifying unit 134 identifies a sensor group to which the sensor 20 that has transmitted the sensor data item accepted by the accepting unit 132 belongs. For example, the identifying unit 134 refers to the group data 121 and identifies a sensor group associated with the sensor ID included in the sensor data item. The identifying unit 134 assigns a unique data ID to the sensor data item.

The first acquiring unit 135 refers to the cache memory 140 and acquires transmitted data items associated with the sensor group identified by the identifying unit 134. For example, the first acquiring unit 135 reads successively from the cache memory 140 the transmitted data items associated with the sensor group identified by the identifying unit 134.

Figure 5:
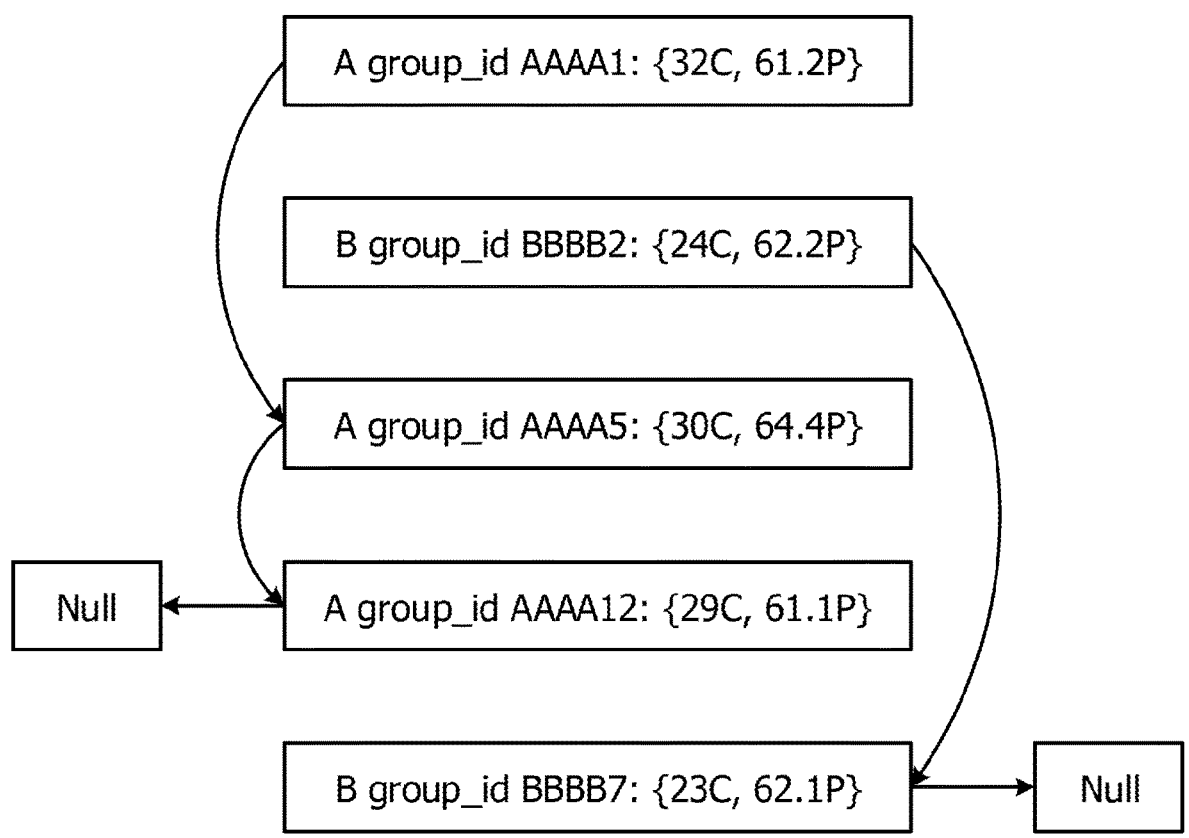
FIG. 5 is a diagram illustrating data reading from the cache memory.

FIG. 5 is a diagram illustrating data reading from the cache memory 140. The first acquiring unit 135 searches for the transmitted data items associated with the sensor group successively from the top. The first acquiring unit 135 returns "Null" if no data item associated with the sensor group remains after searching. For example, when reading transmitted data items associated with the sensor group "A", the first acquiring unit 135 reads data items on the first line, the third line, and the fourth line successively as depicted in FIG. 5. When reading transmitted data items associated with the sensor group "B", the first acquiring unit 135 reads data items on the second line and the fifth line successively as depicted in FIG. 5.

The determining unit 136 determines whether any of the transmitted data items acquired by the first acquiring unit 135 includes the detected data in the sensor data item accepted by the accepting unit 132. For example, the determining unit 136 compares the detected data with the transmitted data items that have been successively read by the first acquiring unit 135 and determines whether there is a transmitted data item whose data field values all coincide with the corresponding data field values in the detected data.

When the determining unit 136 determines that one of the transmitted data items that have been acquired includes the detected data, the second acquiring unit 137 refers to the cache memory 140 and acquires a data ID associated with the transmitted data item. For example, if there is a transmitted data item, among the transmitted data items that have been read, whose data field values all coincide with the corresponding data field values in the detected data, the second acquiring unit 137 acquires the data ID of the transmitted data item.

When the determining unit 136 determines that one of the transmitted data items that have been acquired includes the detected data, the transmitting unit 138 transmits the data ID acquired by the second acquiring unit 137 to the cloud server 50 without transmitting the detected data. For example, if there is a transmitted data item whose data field values all coincide with the corresponding data field values in the detected data, the transmitting unit 138 transmits to the cloud server 50 the data ID of the transmitted data item.

In contrast, when the determining unit 136 determines that none of the transmitted data items that have been acquired includes the detected data, the transmitting unit 138 assigns a data ID that is unique among all the sensor groups to the detected data and transmits the detected data and the assigned data ID to the cloud server 50. For example, if there is no transmitted data item whose data field values all coincide with the corresponding data field values in the detected data, the transmitting unit 138 assigns a unique data ID to the detected data. Subsequently, the transmitting unit 138 transmits the assigned data ID in association with the detected data to the cloud server 50.

The transmitted-data management unit 131 updates the cache memory 140. For example, the transmitted-data management unit 131 registers in the cache memory 140 as a transmitted data item the detected data, which has been transmitted, in association with the identified sensor group and the data ID. If the number of the registered transmitted data items stored in the cache memory 140 exceeds a predetermined number as a result of the registration, the transmitted-data management unit 131 removes from the cache memory 140 a transmitted data item that has not coincided with an accepted data item for the longest time. For example, if there is a transmitted data item whose data field values all coincide with the corresponding data field values in the detected data, the transmitted-data management unit 131 moves the record corresponding to the transmitted data item to the top of the transmitted-data-item list stored in the cache memory 140. If there is no transmitted data item whose data field values all coincide with the corresponding data field values in the detected data, the transmitted-data management unit 131 removes a record from the bottom of the transmitted-data-item list stored in the cache memory 140. The transmitted-data management unit 131 adds the detected data in association with the sensor group and the data ID to the top of the list.

Figure 6:
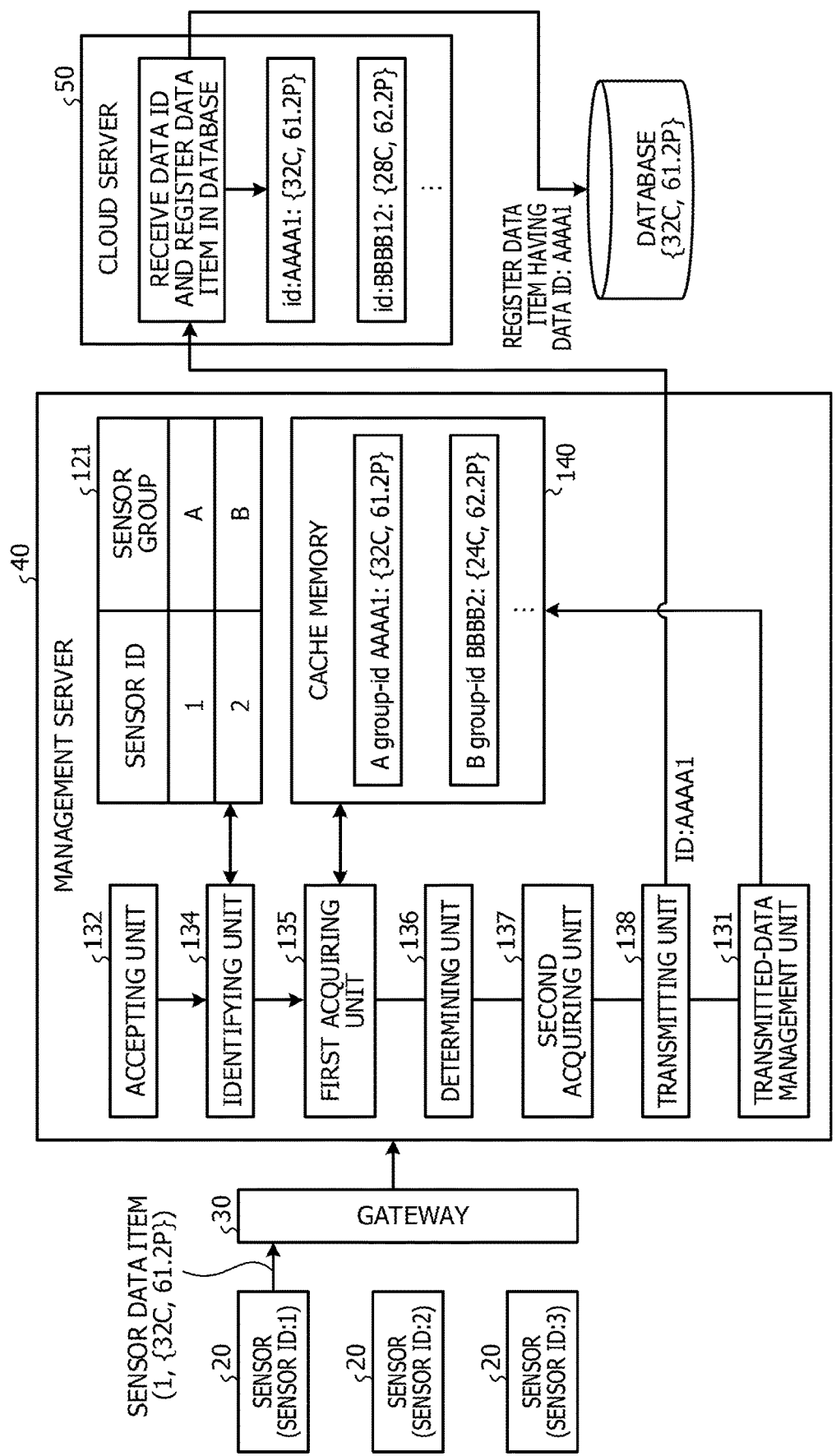
FIG. 6 is a diagram illustrating a flow of collecting data items from sensors.

Referring to FIG. 6, a flow of collecting data items from the sensors 20 will be described. FIG. 6 is a diagram illustrating a flow of collecting data items from the sensors 20.

Each of the sensors 20 periodically detects temperature and pressure and transmits to the gateway 30 via wireless transmission a sensor data item that includes the sensor ID and detected data indicating detected values of temperature and pressure. In the example in FIG. 6, one of the sensors 20 that has a sensor ID "1" transmits a sensor data item "1, {32 C, 61.2 P}" to the gateway 30. The sensor ID of the sensor 20 that transmits the sensor data item is indicated by "1" in the sensor data item. The detected data is represented by "{32 C, 61.2 P}" in the sensor data item. The detected temperature is 32° C., which is represented by "32 C", and the detected pressure is 61.2 Pa, which is represented by "61.2 P".

The gateway 30 transmits the received sensor data item to the management server 40.

In the management server 40, the accepting unit 132 accepts the sensor data item. The identifying unit 134 refers to the group data 121 and identifies a sensor group associated with the sensor ID included in the sensor data item. In the example in FIG. 6, the sensor ID "1" is determined to correspond to the sensor group "A".

The first acquiring unit 135 refers to the cache memory 140 and acquires transmitted data items associated with the identified sensor group. In the example in FIG. 6, the first acquiring unit 135 reads successively from the cache memory 140 the transmitted data items associated with the sensor group "A". In the example in FIG. 6, the transmitted data item "A group_id AAAA1: {32 C, 61.2 P}" is read.

The determining unit 136 determines whether any of the transmitted data items that have been acquired includes the detected data in the sensor data item that has been accepted. For example, the determining unit 136 compares the detected data with the transmitted data items that have been read and determines whether there is a transmitted data item whose data field values all coincide with the corresponding data field values in the detected data. In the example in FIG. 6, the data field values in the transmitted data item that has been read all coincide with the corresponding data field values in the detected data.

When it is determined that one of the transmitted data items that have been acquired includes the detected data, the second acquiring unit 137 acquires a data ID associated with the transmitted data item. In the example in FIG. 6, the second acquiring unit 137 acquires the data ID "AAAA1" assigned to the transmitted data item.

When it is determined that one of the transmitted data items that have been acquired includes the detected data, the transmitting unit 138 transmits the data ID acquired by the second acquiring unit 137 to the cloud server 50 without transmitting the detected data. In the example in FIG. 6, the transmitting unit 138 transmits the data ID "AAAA1" to the cloud server 50.

The cloud server 50 stores received data items and associated data IDs. For example, a data item "{32 C, 61.2 P}" is stored in association with a data ID "AAAA1". Upon receiving a data ID, the cloud server 50 identifies a data item corresponding to the received data ID. For example, the cloud server 50 identifies the data item "{32 C, 61.2 P}" that is associated with the received data ID "AAAA1". The cloud server 50 registers the identified data item in a database. In the example in FIG. 6, the data item "{32 C, 61.2 P}" is registered in the database in this way.

The transmitted-data management unit 131 updates the cache memory 140. For example, the transmitted-data management unit 131 moves the record corresponding to the transmitted data item whose data field values all coincide with the corresponding data field values in the detected data to the top of the transmitted-data-item list stored in the cache memory 140. In the example in FIG. 6, because "A group_id AAAA1: {32 C, 61.2 P}" is already at the top of the list, the record will not be moved.

Thus, upon accepting a new sensor data item from one of the sensors 20, the management server 40 successively compares the newly accepted sensor data item with transmitted data items received from sensors 20 that belong to the same sensor group as the sensor 20 that has transmitted the sensor data item. If a data item that is identical to the newly accepted sensor data item is stored, the management server 40 transmits a data ID of the identical data item to the cloud server 50. In contrast, if a data item that is identical to the newly accepted sensor data item is not stored, the management server 40 transmits a data ID and the detected data to the cloud server 50. Thus, the management server 40 may reduce the number of transmitted data items to compare by comparing the newly accepted sensor data item with the transmitted data items in the sensor group, which may consequently reduce the load to determine whether the accepted data item is to be transmitted.

Figure 7:
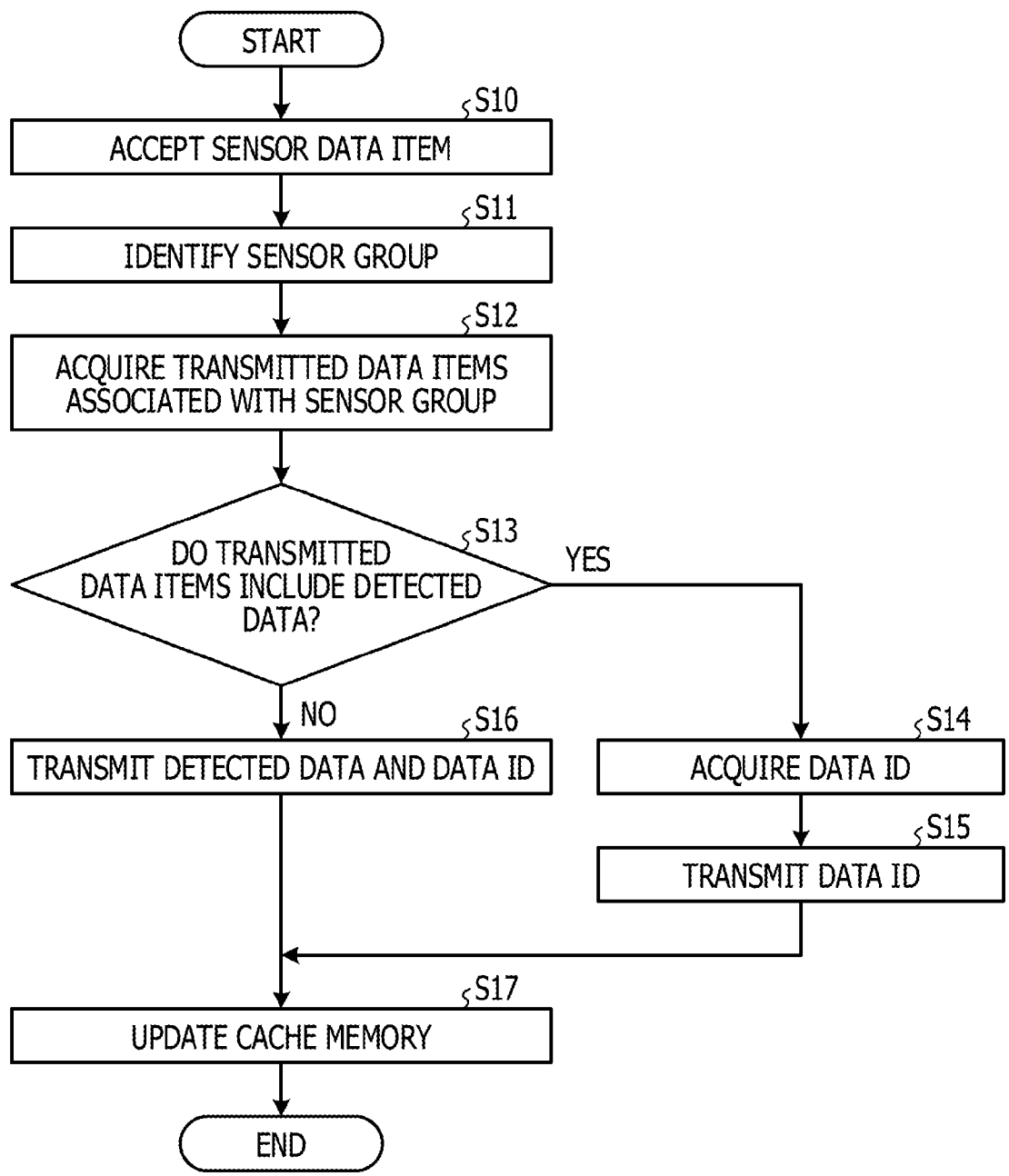
FIG. 7 is a flowchart illustrating an example transmission process according to the first embodiment.

Next, a transmission process flow performed by the management server 40 according to the first embodiment will be described. FIG. 7 is a flowchart illustrating an example transmission process according to the first embodiment. The transmission process is performed at a predetermined time point, for example, when the communication unit 110 receives a sensor data item.

The accepting unit 132 accepts the sensor data item that has been received (step S10). The identifying unit 134 refers to the group data 121 and identifies a sensor group associated with the sensor ID included in the sensor data item (step S11). The first acquiring unit 135 refers to the cache memory 140 and acquires transmitted data items associated with the sensor group that has been identified (step S12).

The determining unit 136 determines whether any of the transmitted data items that have been acquired includes the detected data in the sensor data item that has been accepted (step S13). When it is determined that one of the transmitted data items that have been acquired includes the detected data (Yes in step S13), the second acquiring unit 137 acquires a data ID associated with the transmitted data item (step S14). The transmitting unit 138 transmits the data ID acquired by the second acquiring unit 137 to the cloud server 50 (step S15).

In contrast, when it is determined that none of the transmitted data items that have been acquired includes the detected data (No in step S13), the transmitting unit 138 assigns to the detected data a data ID that is unique among all the sensor groups. Subsequently, the transmitting unit 138 transmits the detected data and the assigned data ID to the cloud server 50 (step S16).

The transmitted-data management unit 131 updates the cache memory 140 (step S17) and terminates the process. For example, the transmitted-data management unit 131 registers in the cache memory 140 as a transmitted data item the detected data, which has been transmitted, in association with the identified sensor group and the data ID. If the number of the registered transmitted data items stored in the cache memory 140 exceeds a predetermined number as a result of the registration, the transmitted-data management unit 131 removes from the cache memory 140 a transmitted data item that has not coincided with an accepted data item for the longest time.

Thus, the management server 40 accepts detected data detected by one of the sensors 20 and a sensor ID to identify the sensor 20. The management server 40 refers to the group data 121 stored in the storage unit 120, which stores identification information to identify a sensor group in association with sensors that belong to the sensor group, and identifies a sensor group associated with the accepted sensor ID. The management server 40 refers to the cache memory 140, which stores transmitted data items detected by the sensors 20 included in each of the sensor groups in association with the sensor group, and acquires transmitted data items associated with the identified sensor group. The management server 40 determines whether any of the transmitted data items that have been acquired includes the detected data that has been accepted. When one of the transmitted data items that have been acquired includes the detected data that has been accepted, the management server 40 refers to the cache memory 140, which stores data IDs of the transmitted data items in association with the transmitted data items, and acquires a data ID associated with the one of the transmitted data item. The management server 40 transmits the data ID that has been acquired without transmitting the detected data that has been accepted. As a result, the management server 40 may reduce a load to determine whether the data item that has been accepted is to be transmitted.

The management server 40 also associates identification information to identify the sensor group with sensors 20 that have the same data format and registers in the group data 121 in the storage unit 120 the sensors 20 in association with the identification information to identify the sensor group. Thus, the management server 40 manages the transmitted data items for each sensor group that includes the same data formats. As a result, in determination processing, the management server 40 compares the detected data that has been accepted with the transmitted data items that have the same data format as the detected data, and a search range for determination may be restricted, leading to an improved search performance.

The management server 40 associates identification information to identify the sensor group with sensors 20 whose detected values are expected to be in each range of detected values included in the detected data and registers in the group data 121 in the storage unit 120 the sensors 20 in association with the identification information to identify the sensor group. Thus, the management server 40 manages the transmitted data items for each sensor group that includes the same range of detected values. As a result, in determination processing, the management server 40 compares the detected data that has been accepted with the transmitted data items that have the same range of detected values as the detected data, and a search range for determination may be restricted, leading to an improved search performance.

When none of the transmitted data items that have been acquired includes the detected data that has been accepted, the management server 40 assigns a data ID that is unique among all the sensor groups to the detected data and transmits the detected data and the assigned data ID. The management server 40 registers in the cache memory 140 as a transmitted data item the detected data, which has been transmitted, in association with the identified sensor group and the data ID. If the number of the registered transmitted data items exceeds a predetermined number, the management server 40 removes a transmitted data item that has not coincided with a detected data item for the longest time. As a result, the management server 40 enables the cache memory 140 to retain transmitted data items whose data field values have a high frequency to appear in the detected data and efficiently determines whether a data item that has been accepted is to be transmitted.

Second Embodiment

Figure 8:
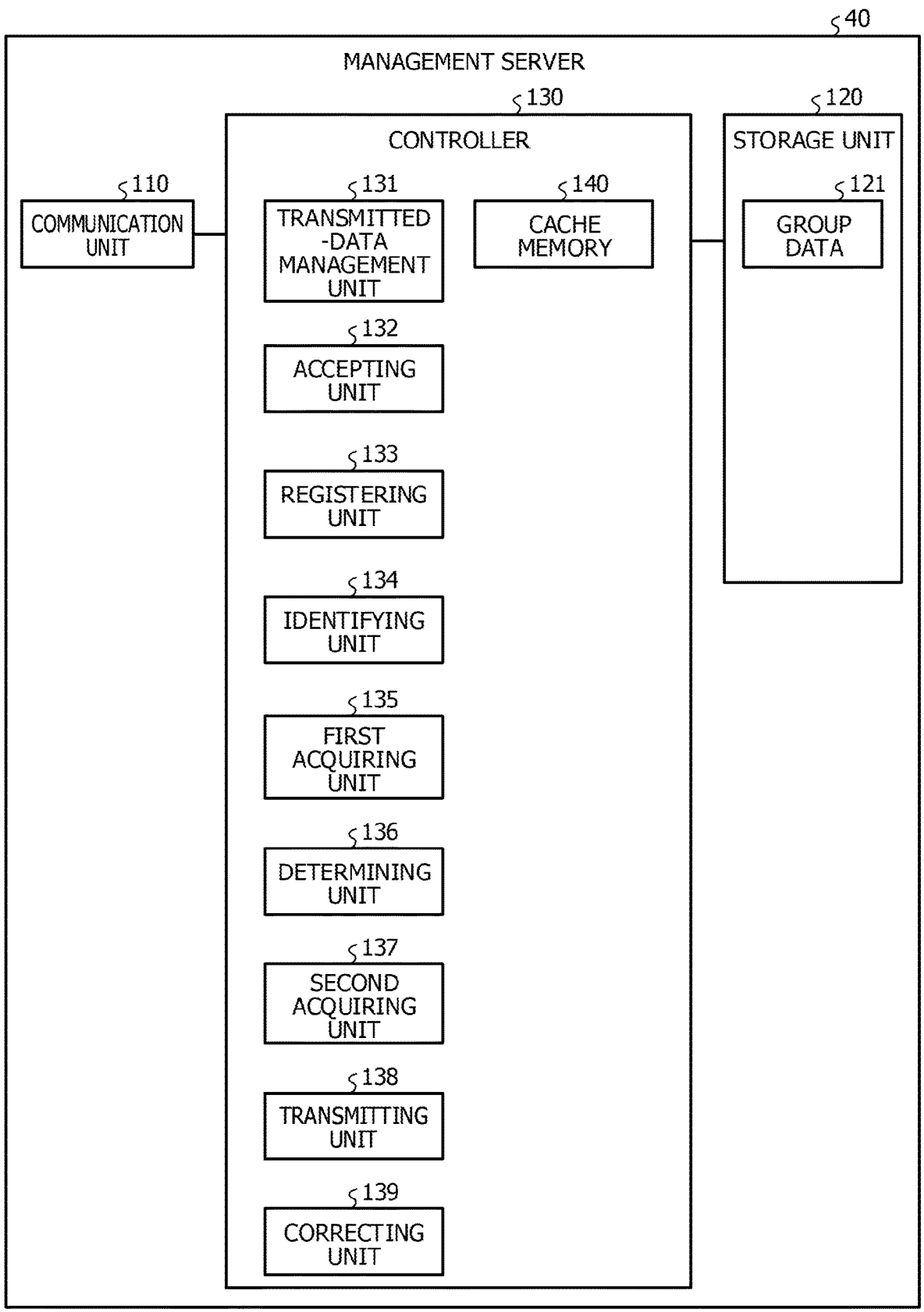
FIG. 8 is a block diagram illustrating a configuration of a management server according to a second embodiment.

Next, a second embodiment will be described. FIG. 8 is a block diagram illustrating a configuration of a management server according to the second embodiment. Because a management server 40 illustrated in FIG. 8 includes the same portions as the management server 40 in the first embodiment, the same configurations will be denoted by the same symbols, and descriptions of duplicate configurations and operation will be omitted.

The controller 130 of the management server 40 in the second embodiment further includes a correcting unit 139.

The correcting unit 139 corrects detected data, which is included in a sensor data item accepted by the accepting unit 132, to a predetermined precision corresponding to a sensor group to which the sensor 20 that has transmitted the sensor data item belongs.

In the IoT setup, data may be collected from the sensors 20, which are commercially available from various manufactures. Depending on manufactures and models, the sensors 20 may have a different degree of precision for detecting a condition and also a different degree of precision in detected values included in sensor data items. For example, when detecting temperature, some of the sensors 20 record a detected temperature value as an integer, such as 32° C., and some others record a detected temperature value to one decimal place, such as 32.1° C.

Thus, the correcting unit 139 corrects the detected data to the predetermined precision corresponding to each of the sensor groups. The precision of detected values for each of the sensor groups may be set in advance. The precision of detected values for each of the sensor groups may be accepted from an external device such as the cloud server 50. For example, the registering unit 133 may accept the precision of detected values for each of the sensor groups from an external device such as the cloud server 50 and register the accepted precision of detected values in the group data 121. The registering unit 133 may also obtain the precision of each of the detected values of the detected data in the sensor data items received from the sensors 20 that belong to each of the sensor groups and register in the group data 121 the lowest precision of the detected values.

For example, in accordance with the group data 121, the correcting unit 139 corrects the detected data to the lowest precision of the detected values of the sensors 20 that belong to the sensor group. If there are a sensor 20 that detects temperature 32.1° C. and another sensor 20 that detects temperature 32° C. in a sensor group, the correcting unit 139 rounds or discards the first decimal place in the detected value to correct the temperature 32.1° C. to 32° C., which is an integer temperature.

The determining unit 136 determines whether any of the transmitted data items includes the detected data whose precision is corrected. When the determining unit 136 determines that none of the transmitted data items that have been acquired includes the detected data whose precision is corrected, the transmitting unit 138 assigns a data ID that is unique among all the sensor groups to the detected data whose precision is corrected. Subsequently, the transmitting unit 138 transmits the detected data whose precision is corrected and the data ID to the cloud server 50. The transmitted-data management unit 131 registers in the cache memory 140 as a transmitted data item the detected data whose precision is corrected in association with the identified sensor group and the data ID.

Thus, the management server 40 enables all the detected values in detected data in a sensor group to have the same precision, leading to an increased hit ratio for the transmitted data items that are stored in the cache memory 140 in the determination processing. Because the hit ratio for the transmitted data items increases, the management server 40 more often transmits only the data IDs to the cloud server 50 and may reduce loads placed on the network N2.

Figure 9:
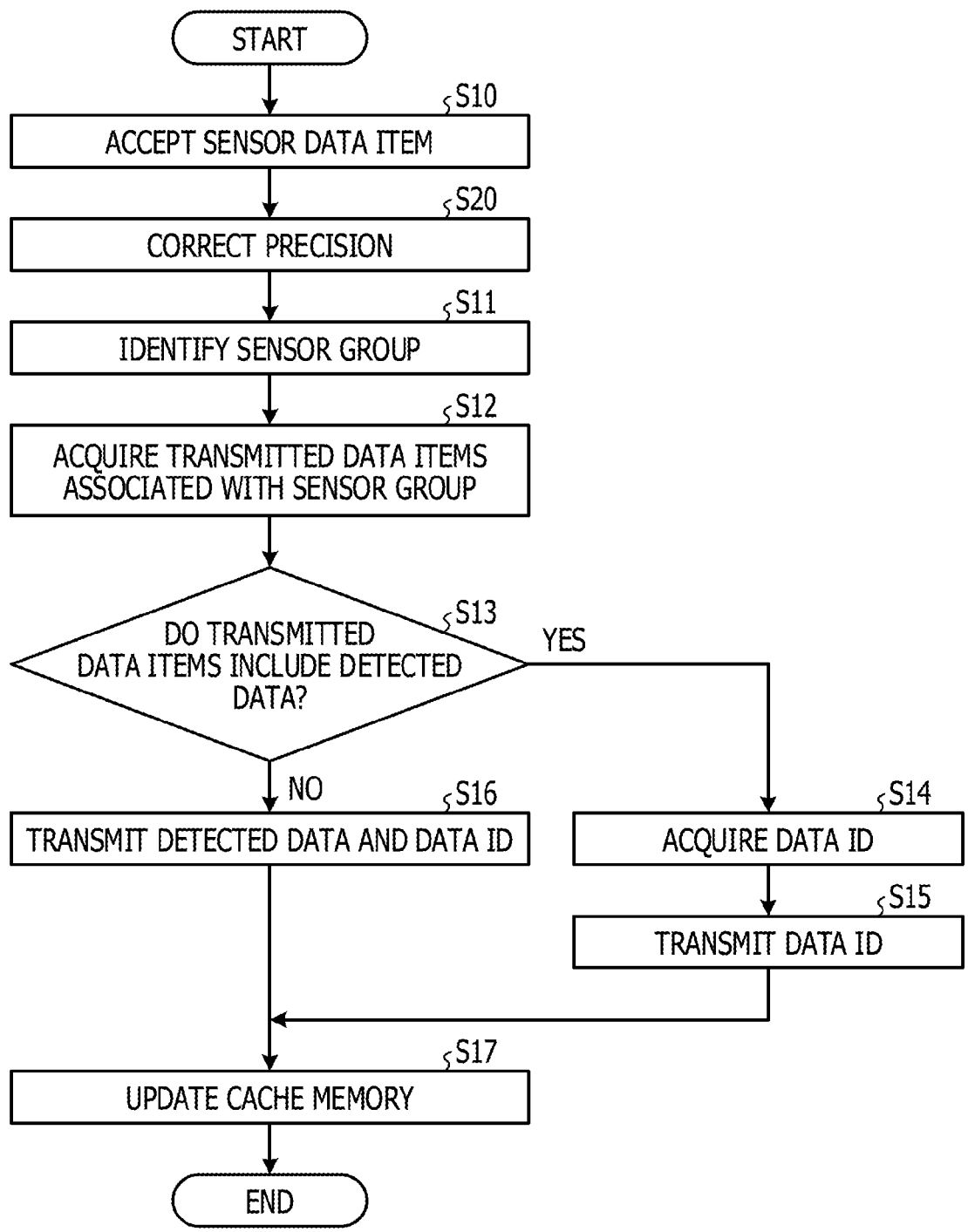
FIG. 9 is a flowchart illustrating an example transmission process according to the second embodiment.

Next, a transmission process flow performed by the management server 40 according to the second embodiment will be described. FIG. 9 is a flowchart illustrating an example transmission process according to the second embodiment. In the description below, steps S10, S11, S12, S14, and S15 are similar to those in the first embodiment, and descriptions of these steps will be omitted.

The correcting unit 139 corrects detected data included in a sensor data item that has been accepted to a predetermined precision corresponding to a sensor group to which the sensor 20 that has transmitted the sensor data item belongs (step S20).

The determining unit 136 determines whether any of the transmitted data items that have been acquired includes the detected data whose precision is corrected (step S13). When it is determined that none of the transmitted data items that have been acquired includes the detected data whose precision is corrected (No in step S13), the transmitting unit 138 assigns a data ID that is unique among all the sensor groups to the detected data whose precision is corrected. Subsequently, the transmitting unit 138 transmits the detected data whose precision is corrected and the assigned data ID to the cloud server 50 (step S16).

The transmitted-data management unit 131 registers in the cache memory 140 as a transmitted data item the detected data whose precision is corrected in association with the identified sensor group and the data ID (step S17).

Thus, the management server 40 corrects the detected data in the sensor data items that have been accepted to the predetermined precision corresponding to the identified sensor group. The management server 40 determines whether any of the transmitted data items that have been acquired includes the detected data whose precision is corrected. As a result, because the hit ratio for the transmitted data items increases, the management server 40 may reduce loads placed on the network N2.

Third Embodiment

Although the first and second embodiments are described, various embodiments other than the embodiments described above are possible.

For example, in the embodiments described above, although the case where sensor groups and data IDs are stored in the cache memory 140 in association with the transmitted data items is described, the case is not meant to be limiting. The sensor groups and the data IDs may be separately associated with the transmitted data items and stored in the cache memory 140 or the storage unit 120.

Although in the embodiments described above, the case where, when a transmitted data item includes detected data in a sensor data item that has been accepted, the data ID of the transmitted data item is transmitted without transmitting the detected data is described, the case is not meant to be limiting. For example, the sensor ID included in the sensor data item that has been accepted may be transmitted along with the data ID.

The individual components in the units depicted in the figures may not be configured physically as depicted. In other words, specific forms of distribution and integration of the individual units are not limited to those depicted in the figures, and all or part of those may be distributed or integrated functionally or physically in any units in accordance with various loads and usage conditions. For example, the accepting unit 132, the registering unit 133, the identifying unit 134, the first acquiring unit 135, the determining unit 136, the second acquiring unit 137, the transmitting unit 138, and the correcting unit 139 may optionally be integrated. The aforementioned order in which each processing operation depicted in the figures is performed is not limiting. The processing operations may be performed simultaneously or in a different order as long as no discrepancy in the processing operations occurs.

Further, all or any part of the various processing functions performed by the individual units may be executed by a CPU or a microcomputer such as an MPU or a micro controller unit (MCU). Obviously, all or any part of the various processing functions may be performed by using a program interpreted and executed on a CPU or a microcomputer such as an MPU or an MCU or by using hardware based on wired logic connections.

Figure 10:
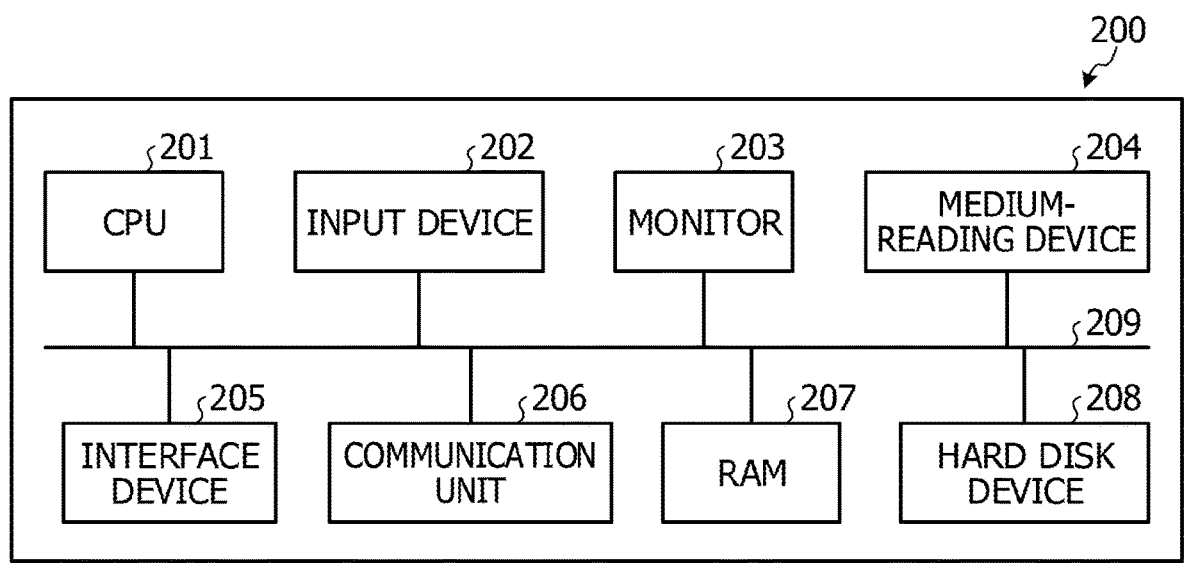
FIG. 10 is a diagram illustrating an example computer that executes a transmission program.

The various processing operations described in the above embodiments may be realized by executing on a computer a program prepared in advance. In the following, an example computer on which a program that has functions similar to the embodiments described above is executed will be described. FIG. 10 is a diagram illustrating the example computer that executes a transmission program.

As depicted in FIG. 10, a computer 200 includes a CPU 201 that executes various computing operations, an input device 202 that accepts a data input, and a monitor 203. The computer 200 also includes a medium-reading device 204 that reads a program and the like from a recording medium, an interface device 205 to connect the computer 200 to various devices, and a communication device 206 to connect the computer 200 to other information processing devices or the like via wired or wireless communication. The computer 200 includes a RAM 207 that stores various kinds of information temporarily and a hard disk device 208. The individual devices 201 to 208 are connected to a bus 209.

The hard disk device 208 stores a transmission program that has functions equivalent to the individual processing units, which are the accepting unit 132, the registering unit 133, the identifying unit 134, the first acquiring unit 135, the determining unit 136, the second acquiring unit 137, the transmitting unit 138, and the correcting unit 139. The hard disk device 208 also stores the group data 121 and various data used to perform the transmission program. The input device 202 accepts various kinds of information, for example, such as operation information from an administrator of the computer 200. The monitor 203 displays various images, for example, such as display images for the administrator of the computer 200. The interface device 205 is connected to, for example, a printing device or the like. The communication device 206, which has a function equivalent to, for example, the communication unit 110 described in FIG. 2, is connected to a network (not depicted) and exchanges various kinds of information with other information processing apparatuses (not depicted).

The CPU 201 performs various processing operations by reading individual programs stored in the hard disk device 208, loading the programs in the RAM 207, and executing the programs. These programs enable the computer 200 to function as the accepting unit 132, the registering unit 133, the identifying unit 134, the first acquiring unit 135, the determining unit 136, the second acquiring unit 137, the transmitting unit 138, and the correcting unit 139.

The hard disk device 208 is a non-limiting example regarding where to store the transmission program described above. For example, the computer 200 may read and perform a program stored in a recording medium that may be read by the computer 200. Examples of the recording medium that may be read by the computer 200 include a portable recording medium such as a compact disc read only memory (CD-ROM), a digital versatile disc (DVD), or a Universal Serial Bus (USB) memory, a semiconductor memory such as a flash memory, and a hard disk drive. The transmission program may be stored in a device connected to a public network, the Internet, a LAN, or the like, and the computer 200 may read the transmission program from the device and perform the program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission control method executed by a computer, the transmission control method comprising:
    receiving, by a first processing apparatus, first data detected by a first sensor among a plurality of sensors and first identification information to identify the first sensor;
    specifying a first sensor group corresponding to the first identification information by referring to first relation information in which sensor group identification to identify respective sensor groups is associated with one or more sensors which belong to the respective sensor groups;
    specifying, by referring to second relation information in which a plurality of pieces of transmitted data, which are detected by one or more sensors of the respective sensor groups and of which transmission to a second information processing apparatus is completed, associated with the respective sensor groups, a first plurality of pieces of transmitted data corresponding to the first sensor group;
    determining whether the first plurality of pieces of transmitted data include the first data;
    when the first plurality of pieces of transmitted data include the first data, specifying, by referring to third relation information in which transmitted data identification information is associated with the plurality of pieces of transmitted data, first transmitted data identification information corresponding to the first plurality of pieces of transmitted data; and
    transmitting the first transmitted data identification information to the second information processing apparatus without transmitting the received first data.

2. The transmission control method according to claim 1, wherein the first sensor group includes a sensor that detects data whose format is identical to a format of the first data.

3. The transmission control method according to claim 1, wherein the first sensor group includes a sensor that is to detect second data including a second detected value that is in a predetermined range in which a first detected value included in the first data is.

4. The transmission control method according to claim 1, further comprising:
    receiving second data detected by a second sensor among the plurality of sensors and second identification information to identify the second sensor;
    specifying a second sensor group corresponding to the second identification information by referring to the first relation information;
    modifying the second data in accordance with a rule associated with the second identification information of the second sensor group;
    specifying a second plurality of pieces of transmitted data associated with the second identification information of the second sensor group by referring to the second relation information; and
    determining whether the second plurality of pieces of transmitted data includes the modified second data.

5. The transmission control method according to claim 1, further comprising:
    when the first plurality of pieces of transmitted data does not include the first data, assigning new transmitted data identification information to the first data; and
    transmitting the first data and the new transmitted data identification information to the second information processing apparatus.

6. The transmission control method according to claim 5, further comprising:

when the first plurality of pieces of transmitted data does not include the first data, adding the first data into the first plurality of pieces of transmitted data.

7. The transmission control method according to claim 6, wherein the adding includes, when a number of pieces of transmitted data corresponding to the sensor groups exceeds a threshold, removing, from the pieces of transmitted data, one piece of transmitted data in which determination of whether the one piece of transmitted data includes received data is performed most in the past.

8. A transmission control apparatus comprising:
a memory; and
a processor coupled to the memory and the processor configured to:
receive first data detected by a first sensor among a plurality of sensors and first identification information to identify the first sensor;
specify a first sensor group corresponding to the first identification information by referring to first relation information in which sensor group identification to identify respective sensor groups is associated with one or more sensors which belong to the respective sensor groups;
specify, by referring to second relation information in which a plurality of pieces of transmitted data, which are detected by one or more sensors of the respective sensor groups and of which transmission to a second information processing apparatus is completed, associated with the respective sensor groups, a first plurality of pieces of transmitted data corresponding to the first sensor group;
determine whether the first plurality of pieces of transmitted data include the first data;
when the first plurality of pieces of transmitted data include the first data, specify, by referring to third relation information in which transmitted data identification information is associated with the plurality of pieces of transmitted data, first transmitted data identification information corresponding to the first plurality of pieces of transmitted data; and
transmit the first transmitted data identification information to the second information processing apparatus without transmitting the received first data.

9. The transmission control apparatus according to claim 8, wherein the first sensor group includes a sensor that detects data whose format is identical to a format of the first data.

10. The transmission control apparatus according to claim 8, wherein the first sensor group includes a sensor that is to detect second data including a second detected value that is in a predetermined range in which a first detected value included in the first data is.

11. The transmission control apparatus according to claim 8, the processor further configured to:
receive second data detected by a second sensor among the plurality of sensors and second identification information to identify the second sensor;
specify a second sensor group corresponding to the second identification information by referring to the first relation information;
modify the second data in accordance with a rule associated with the second identification information of the second sensor group;
specify a second plurality of pieces of transmitted data associated with the second identification information of the second sensor group by referring to the second relation information; and
determine whether the second plurality of pieces of transmitted data includes the modified second data.

12. The transmission control apparatus according to claim 8, the processor further configured to:
when the first plurality of pieces of transmitted data does not include the first data, assign new transmitted data identification information to the first data; and
transmit the first data and the new transmitted data identification information to the second information processing apparatus.

13. The transmission control apparatus according to claim 12, the processor further configured to:
when the first plurality of pieces of transmitted data does not include the first data, execute to addition of the first data into the first plurality of pieces of transmitted data.

14. The transmission control apparatus according to claim 13, wherein the addition includes, when a number of pieces of transmitted data corresponding to the sensor groups exceeds a threshold, removing, from the pieces of transmitted data, one piece of transmitted data in which determination of whether the one piece of transmitted data includes received data is performed most in the past.

15. A non-transitory computer-readable medium storing a transmission control program that causes a computer to execute a process comprising:
receiving first data detected by a first sensor among a plurality of sensors and first identification information to identify the first sensor;
specifying a first sensor group corresponding to the first identification information by referring to first relation information in which sensor group identification to identify respective sensor groups is associated with one or more sensors which belong to the respective sensor groups;
specifying, by referring to second relation information in which a plurality of pieces of transmitted data, which are detected by one or more sensors of the respective sensor groups and of which transmission to a second information processing apparatus is completed, associated with the respective sensor groups, a first plurality of pieces of transmitted data corresponding to the first sensor group;
determining whether the first plurality of pieces of transmitted data include the first data;
when the first plurality of pieces of transmitted data include the first data, specifying, by referring to third relation information in which transmitted data identification information is associated with the plurality of pieces of transmitted data, first transmitted data identification information corresponding to the first plurality of pieces of transmitted data; and
transmitting the first transmitted data identification information to the second information processing apparatus without transmitting the received first data.

* * * * *